United States Patent
Marty et al.

(10) Patent No.: US 10,563,422 B2
(45) Date of Patent: Feb. 18, 2020

(54) METHOD FOR REPAIRING A STRUCTURE COMPRISING AT LEAST ONE ZONE TO BE HEATED

(71) Applicants: Airbus SAS, Blagnac (FR); Airbus Operations SAS, Toulouse (FR)

(72) Inventors: Jean-Claude Marty, Toulouse (FR); Julien Charles, Toulouse (FR); Olivier Lebahar, Fontenilles (FR); Franck Dobigeon, Nantes (FR); Guillaume Ferrer, Toulouse (FR); Thierry Borja, Pibrac (FR); Sebastien Hanser, La Salvetat St Gilles (FR)

(73) Assignees: AIRBUS OPERATIONS SAS, Toulouse (FR); AIRBUS SAS, Blagnac (FR)

( * ) Notice: Subject to any disclaimer, the term of this patent is extended or adjusted under 35 U.S.C. 154(b) by 0 days.

(21) Appl. No.: 16/012,241

(22) Filed: Jun. 19, 2018

(65) Prior Publication Data

US 2018/0363319 A1 Dec. 20, 2018

(30) Foreign Application Priority Data

Jun. 20, 2017 (FR) ...................... 17 55590

(51) Int. Cl.
| | | |
|---|---|---|
| *E04H 15/20* | (2006.01) | |
| *B29C 73/02* | (2006.01) | |
| *B05D 3/02* | (2006.01) | |
| *B05D 3/04* | (2006.01) | |
| *B29C 73/34* | (2006.01) | |

(Continued)

(52) U.S. Cl.
CPC ........... *E04H 15/20* (2013.01); *B05D 3/0254* (2013.01); *B05D 3/0413* (2013.01); *B05D 5/005* (2013.01); *B29C 73/02* (2013.01); *B29C 73/34* (2013.01); *B29L 2031/3082* (2013.01); *B64C 1/06* (2013.01); *E04H 2015/201* (2013.01)

(58) Field of Classification Search
CPC ......... B29C 73/02; B29C 73/10; B29C 73/34; B29C 65/4835; B29C 65/02; B29C 73/26; B05D 3/0254; E04H 15/20
USPC ......................................... 52/2.18
See application file for complete search history.

(56) References Cited

U.S. PATENT DOCUMENTS 3,837,965 A * 9/1974 Mahon .................... B29C 73/32
156/382
4,293,862 A * 10/1981 Beavers ................. B29C 73/10
156/94

(Continued)

FOREIGN PATENT DOCUMENTS

| DE | 102012207468 | 11/2013 |
| EP | 2594391 | 5/2013 |

(Continued)

OTHER PUBLICATIONS

French Search Report, dated Mar. 3, 2018, priority document.

*Primary Examiner* — Beth A Stephan
(74) *Attorney, Agent, or Firm* — Greer, Burns & Crain, Ltd.

(57) ABSTRACT

A method for repairing a structure comprising at least one zone to be heated and which comprises the steps of inflating a frame to form a framework, attaching panels removably to the frame to form an enclosure referred to as a heating enclosure, positioning the enclosure over the zone, heating the interior space of the enclosure using a heating device.

20 Claims, 3 Drawing Sheets

(51) Int. Cl.
  *B05D 5/00* (2006.01)
  *B29L 31/30* (2006.01)
  *B64C 1/06* (2006.01)

(56) References Cited

U.S. PATENT DOCUMENTS

| | | | | |
|---|---|---|---|---|
| 4,352,707 A * | 10/1982 | Wengler | ................ | B29C 65/18 |
| | | | | 156/285 |
| 4,652,319 A * | 3/1987 | Hammond | ......... | B29C 35/0266 |
| | | | | 156/285 |
| 4,893,668 A * | 1/1990 | Nomura | ................ | B60J 1/2011 |
| | | | | 160/327 |
| 5,975,183 A * | 11/1999 | Reis | ................ | B29C 73/12 |
| | | | | 100/211 |
| 6,206,067 B1 * | 3/2001 | Kociemba | ......... | B29C 43/3642 |
| | | | | 156/285 |
| 8,356,649 B2 * | 1/2013 | Cacace | ................ | B29C 73/10 |
| | | | | 156/285 |
| 8,986,479 B2 * | 3/2015 | Evens | ................ | B29C 73/10 |
| | | | | 156/94 |
| 10,222,353 B2 * | 3/2019 | Kollgaard | ............ | G01N 29/09 |
| 2002/0023390 A1 * | 2/2002 | Nagle | ................ | E04H 15/20 |
| | | | | 52/2.18 |
| 2004/0261324 A1 * | 12/2004 | Tewari | ................ | E04H 9/16 |
| | | | | 52/2.18 |
| 2006/0055193 A1 | 3/2006 | Colborne | | |
| 2010/0129229 A1 * | 5/2010 | Grabau | ................ | F03D 1/0658 |
| | | | | 416/248 |
| 2012/0163981 A1 * | 6/2012 | Hong | ................ | F01D 5/288 |
| | | | | 416/224 |
| 2013/0037198 A1 | 2/2013 | Safai et al. | | |
| 2013/0127081 A1 | 5/2013 | Giraud et al. | | |
| 2015/0101258 A1 | 4/2015 | Milo et al. | | |
| 2015/0151498 A1 | 6/2015 | Witte | | |
| 2016/0046088 A1 | 2/2016 | Haag et al. | | |

FOREIGN PATENT DOCUMENTS

| | | |
|---|---|---|
| EP | 2881246 | 6/2015 |
| FR | 3040022 | 2/2017 |
| WO | 2012147080 | 11/2012 |

\* cited by examiner

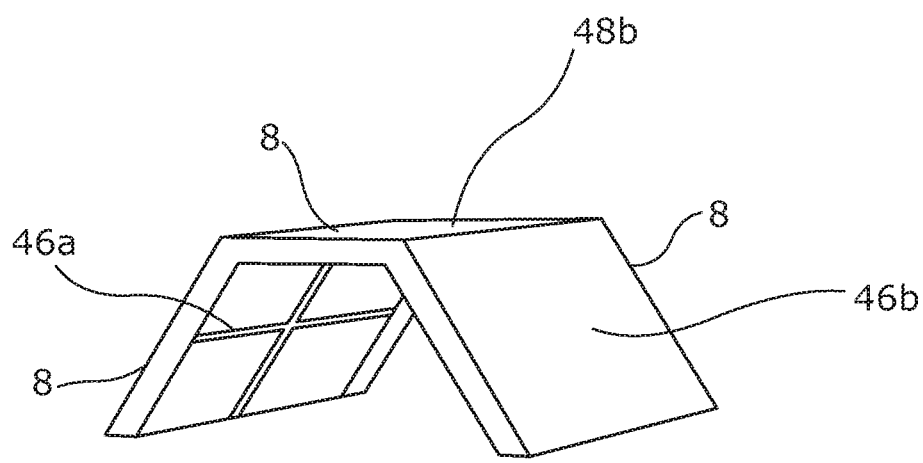
Fig. 3
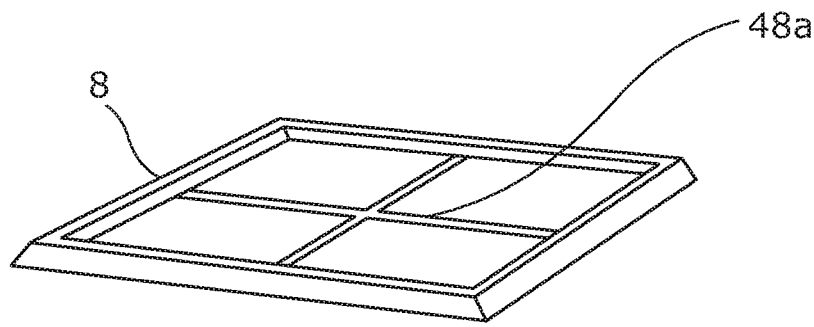
Fig. 4
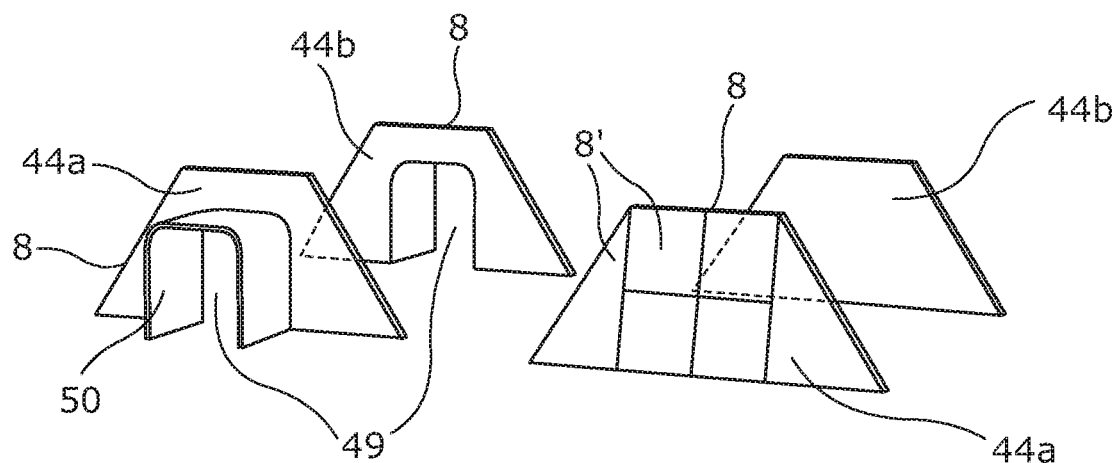
Fig. 5
Fig. 6

METHOD FOR REPAIRING A STRUCTURE COMPRISING AT LEAST ONE ZONE TO BE HEATED

CROSS-REFERENCES TO RELATED APPLICATIONS

This application claims the benefit of the French patent application No. 1755590 filed on Jun. 20, 2017, the entire disclosures of which are incorporated herein by way of reference.

BACKGROUND OF THE INVENTION

The present invention relates to the field of devices and methods for repairing structures, notably aircraft structures.

The structure of an aircraft, and notably of a commercial airliner, may become damaged by incidents of various types, such as bird strike, hail or impact from other objects, and become indented, torn, scratched or suffer any other form of damage requiring repair. Repairs cover as many operations comprising reworking a nick in order to fill it, a crack in order to plug it, as operations comprising applying sealant to orifices made for fixings used for making repairs, as operations comprising repainting or protecting the reworked zones with coats of various materials, as any other types of operation. The term repair is therefore to be understood in the broadest sense, namely, to cover any operation or collection of operations that involve returning a component to a condition in which it is ready for use.

The present invention relates more particularly to repairs that require an application of heat. Heating makes it possible, for example, to polymerize a liner fixed by curing, to dry out a sealant, a coat of paint, a protective film, to accelerate any other form of drying, etc.

In the case, for example, of a heating operation leading to the polymerization of composite structures, recourse is habitually had to an autoclave. However, in the case of repairs made to a component on an airplane, it is necessary to dismantle the component and transport it to the autoclave and then refit it once the component has been repaired, making the repair operation lengthy and tricky, especially if the component is bulky or fragile.

Patent Application EP2881246 filed by Airbus Operations GmbH discloses one example of a repair of a component made of composite. As set out in the application, the repair method uses a chamber made up of two shells positioned on each side of a damaged panel. The closed chamber has an opening through which a hot gas is passed. Flanks are provided on each of the shells so that they can be held in place using magnets. The method allows the repair to be made directly on the airplane, avoiding the autoclave. However, if the component is large in size, installation and the fitting of the magnets prove difficult, and retention by magnetization cannot necessarily be reliably assured.

It is an object of the present invention to propose a repair device and method allowing the difficulty of setting the heating chamber in place to be overcome, particularly for large-sized damaged structures.

SUMMARY OF THE INVENTION

In order to do that, the present invention relates to a method for repairing a structure comprising at least one zone to be heated and which comprises the following steps:
   inflating a frame to form a framework;
   attaching panels removably to the frame to form an enclosure referred to as a heating enclosure;
   positioning the enclosure over the zone;
   heating the interior space of the enclosure using heating means.

The repair method exhibits at least one of the following optional features, considered in isolation or in combination.

The repair method comprises a step of holding the enclosure in position using suction cups connected to the frame and/or to the panels.

The inside of the repair enclosure is heated using a hot fluid transmission system and the same hot fluid transmission system is used for inflating the frame and for heating the enclosure.

Temperature detection means are provided inside the enclosure and are connected to a heating control center outside the enclosure.

The temperature is detected using at least one temperature measurement sensor inside the heating enclosure and in the region of the zone of the structure.

Several temperature measurement sensors are arranged at several different points inside the heating enclosure and several temperature measurement sensors are arranged at several points of the structure.

The frames are coupled via their lateral face and/or base face in order to enlarge the size of the heating enclosure.

BRIEF DESCRIPTION OF THE DRAWINGS

Further objects, advantages and features of the invention will become apparent from reading the description of the invention which is given by way of nonlimiting example with reference to the attached drawings in which:

FIGS. 3 to 5 depict a perspective view of the panels of the device depicted in FIG. 1, these respectively being lateral and upper panels, the lower panel and base panels;

FIG. 6 depicts a perspective view of an alternative base panel to the one depicted in FIG. 5.

DETAILED DESCRIPTION OF THE PREFERRED EMBODIMENTS

Figure 1:
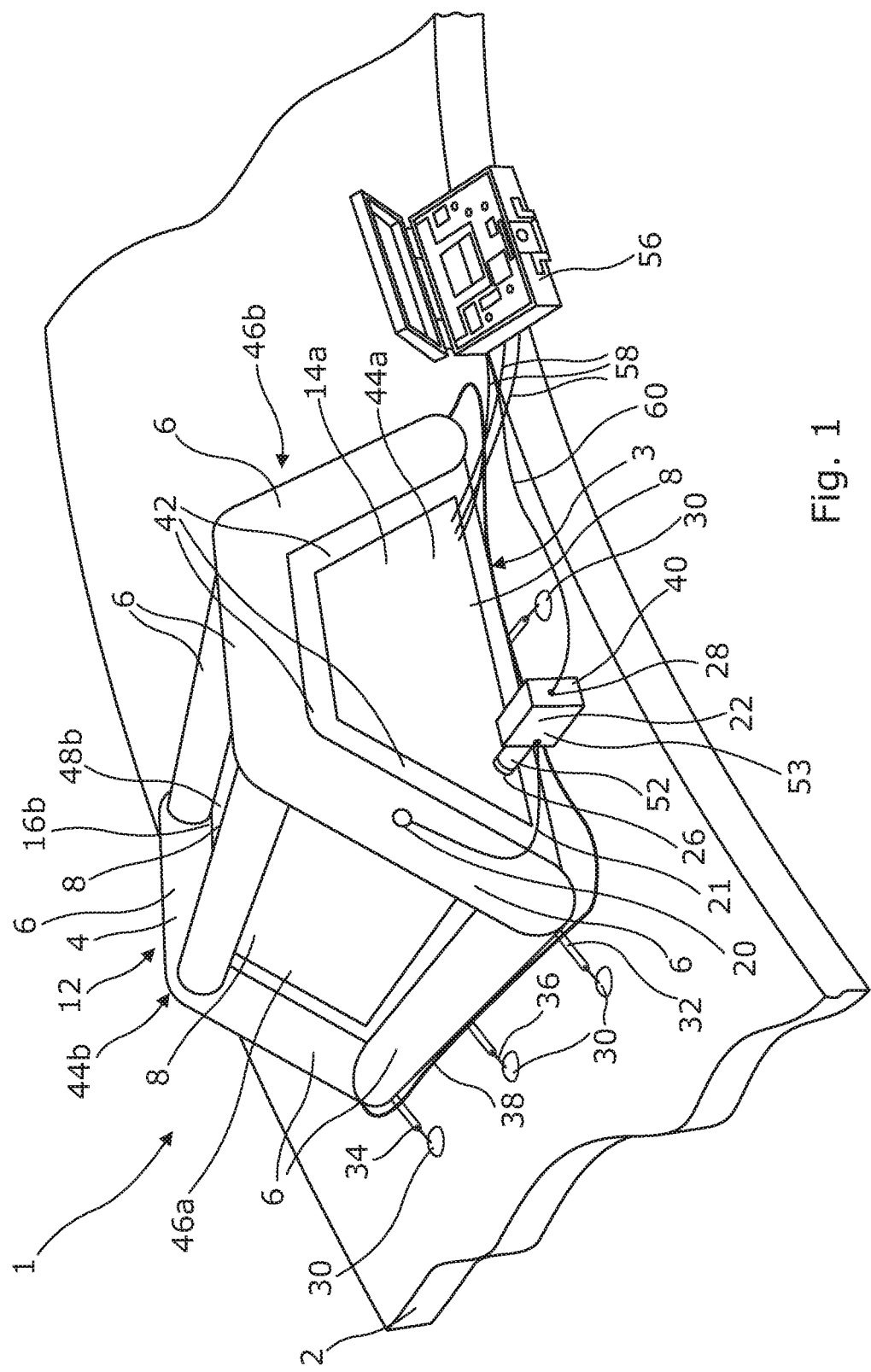
FIG. 1 depicts a perspective view of a repair device according to the present invention.

As FIG. 1 shows, the present invention relates to a device 1 for repairing a structure 2 and, in the example described hereinbelow, an aircraft structure. The structure 2 more specifically has a zone 3 that is to be heated.

The repair device 1 allows the repair to be carried out directly on the structure of the component that needs to be reworked in the region of the zone 3, without needing to dismantle it or even without needing to handle or transport it.

Figure 2:
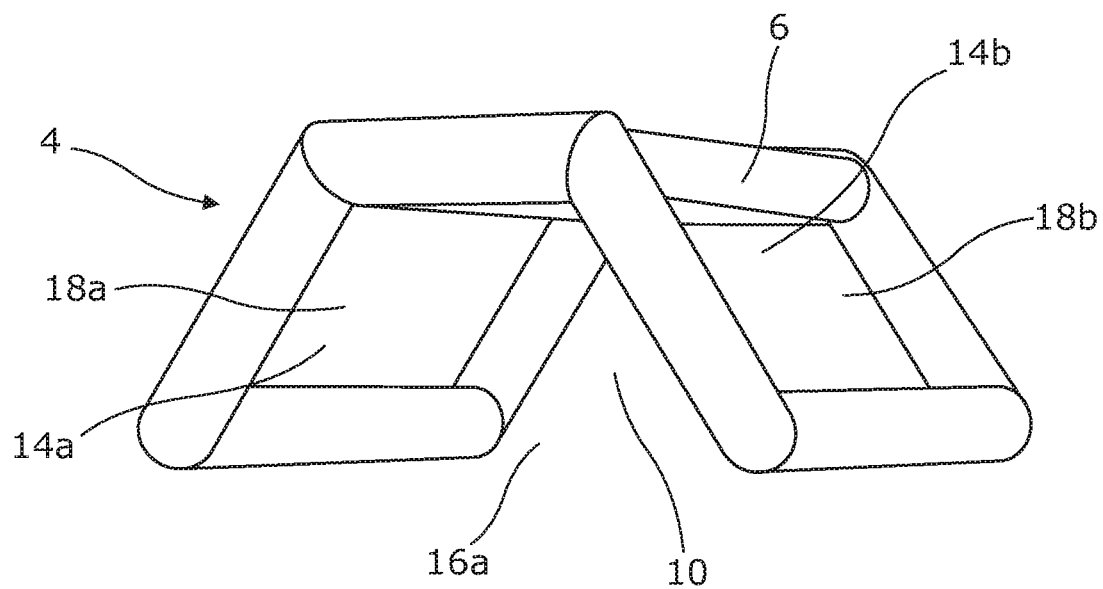
FIG. 2 depicts a perspective view of the inflatable frame of the device depicted in FIG. 1.

As depicted in FIGS. 1 and 2, the repair device 1 comprises an inflatable frame 4. The frame 4 comprises at least three inflatable tubular elements 6 joined together in such a way as to offer a framework that is lightweight and easy to transport, store and set in place and to which panels 8 are removably attached. When the frame 4 is inflated, it is self-supporting and defines an interior space 10 closed by said panels. One of the panels may, depending on the application, be substituted by part of the structure 2. The assembly comprising the inflatable frame 4, panels 8 and possibly the structure 2 forms an enclosure 12 hereinafter referred to as the heating enclosure. The interior space 10 inside the heating enclosure is used as a space for heating the structure 2 on which it rests.

According to the embodiment illustrated, the tubular elements 6 are connected in such a way as to allow an inflation fluid to pass from one element 6 to another and so as to ensure continuity of shape at the intersections between elements.

The frame 4 may, for example, take the form of at least three tubular elements 6 jointed together at a vertex in the manner of a tepee. According to an alternative, it may take the form of a right prism, the bases of which are triangular, in the manner of a ridge tent, each edge corner of the prism being a tubular element. In the embodiment illustrated, the frame 4 takes the form of a right prism, the bases 14 of which are trapezoidal, each edge corner of the prism being a tubular element. According to certain forms of embodiment, certain edge corners may be absent, as will be seen later on.

The frame 4 comprises two trapezoidal base faces 14a, 14b, two rectangular respectively lower and upper faces 16a, 16b, and two rectangular lateral faces 18a, 18b. An element is considered to qualify as lower with respect to another qualified as upper when it is closer to the structure 2. When the repair device 1 is set in place on the structure 2 in the region of the zone 3, the lower face 16a of the frame 4 is the face closest to the structure 2 and the upper face 16b parallel to the lower face 16a is the face furthest away from the structure 2. In the embodiment illustrated, two tubular elements 6 are absent from the frame 4, these being those which should have connected the lower face 16a to each of the base faces 14a, 14b respectively. Thus, when the frame 4 is resting via its lower face 16a on the structure 2, because the free lower edge corners of the lateral faces 18a, 18b are not joined together by tubular elements at the level of the lower face 16a of the frame, they can move apart from one another slightly in order to better conform to said surface of the structure 2. In this way, the heating enclosure 12 can rest on the surface of the structure 2 whatever the shape: flat, single curvature, double curvature, complex curvature, etc., thereof.

At least one inflation valve 20 or equivalent is provided on the frame 4 to allow it to be inflated and deflated. The valve 20 is connected by a pipe 21 to a pump 22 or equivalent (compressor or the like) that performs the inflating—deflating. The inflation fluid can be introduced into the entirety of the frame via a single valve 20; in that case, all of the tubular elements 6 are connected to one another to ensure inflation of the entire frame. In the embodiment illustrated, the inflation valve 20 is provided on a tubular element of the base face 14a to which is attached the panel 8 that has an opening 26 for introducing hot air into the interior space 10 inside the enclosure 12 from heating means comprising, for example, a hot air gun 28. In this way, all of the auxiliaries (pump 22, hot air gun 28, etc.) can be gathered together into a more compact zone so that the operator has them all in easy reach.

According to the embodiment illustrated, the hot air gun used for heating the interior space 10 inside the enclosure 12 may also be used as a pump for inflating the frame, the inflation fluid then being hot air.

According to an alternative, it is possible to allow inflation via several valves.

The material used for the frame 4 needs to be flexible enough that it can be handled easily, rolled up and unrolled, inflated and insulating with respect to heat because it, with the panels 8, is going to form a heating enclosure 12. The frame 4, like the panels 8, as will be seen later on, need to be able to withstand very high temperatures which may range up to 250 degrees or even more. One possible material is thermoplastic polyurethane (TPU) which has a good ability to withstand heat, or alternatively a polyester fiber ceramic material. The tubular elements 6 may be partially or completely coated with a material that offers abrasion resistance and ease of washing, for example a silicone coating may be employed.

The enclosure 12 is held in place by any type of means such as stickers, double-sided adhesive, Gecko (registered tradename) adhesive tape, straps, etc., or alternatively, for example, by suction cups 30 or any other equivalent device of the suction gripper type. The suction gripper device will be referred to hereinafter as a suction cup. The suction cups are associated with the frame 4 and/or with the panels 8.

At the frame 4, the suction cups 30 are connected to the tubular elements 6 of the lower face 16a. In the embodiment illustrated, there are three suction cups provided per tubular element of the lower face 16a.

At the panels 8, the suction cups 30 are connected to the panels 8 which are not fixed to a tubular element of the lower face 16a. In the embodiment, a suction cup is provided in the middle of the lower edge of the face 14a and of the base face 14b.

The tubular elements 6 and the panels 8 connected to suction cups 30 comprise tabs 32 for attaching the suction cups 30. The tab 32 may be provided with a simple opening 34 in which a stem 36 of the suction cup is inserted, in the same way as a tent is pegged down. However, any other type of fixing is also possible. The tubular element and/or the panel 8, and the suction cup 30 may, for example, comprise fasteners of the hook, clip or some other type.

The suction cup 30 may have any known type of shape. It is made of a strong, fluid tight material with a flexibility such that the suction cup can conform to non-planar surfaces liable to exhibit uneven relief. The suction cup may, for example, be made of rubber.

The suction cups 30 are connected by at least one hose 38 to a pumping means 40. In the embodiment, the collection of suction cups is connected to the pumping means by a single hose 38. The pumping means 40 which may, for example, take the form of an air pump 40, subject the suction cup to a vacuum: the suction cup 30 is activated by the difference in pressure between the inside (created vacuum) and the outside (atmosphere). The suction cup adheres by suction to the surface of the structure 2 and thus allows the inflatable frame 4 to be fixed in position.

As shown by FIG. 1 and FIGS. 3 to 5, panels 8 are attached to the framework formed by the inflatable frame 4 in order to close it and thus offer a closed enclosure 12. Each panel 8 is held in place by at least two tubular elements 6.

Attachment between the panel 8 and the corresponding tubular element or elements 6 is afforded by any type of removable attachment means. For example, the attachment means are of the contact fixing type, such as "VELCRO" (registered tradename) fastener type, or adhesive surfaces, etc. According to the embodiment illustrated, Velcro hook strips are bonded, stitched, or the like to the tubular elements 6 and corresponding Velcro loop strips are fixed to the panels 8 (or vice versa). All that is then required is for the strips to be brought together and the panel 8 will stick to the associated tubular elements 6 of the frame 4.

According to one embodiment illustrated in FIG. 1, the panels 8 have reinforcers 42 at all of their edges in connection with the frame 4. The reinforcers 42 strengthen the panel in the zones where the loadings are the highest.

Just like the frame 4, the panel 8 is made from a heat insulating material such as, for example, thermoplastic polyurethane (TPU) or polyester fiber ceramic. The panel needs to exhibit a certain rigidity that the TPU or alternatively the ceramic alone may afford but which can be enhanced using another material. The panel 8 may therefore be made up of a combination of materials that give it the desired rigidity, such as, for example, a combination of aluminum and polyester fiber ceramic, or else of aluminum and TPU. Specifically, aluminum is a solid material and heat-resistant material.

Thus, it is possible, for example, for the panel 8 to comprise an aluminum core providing rigidity surrounded on all sides by a material such as polyester fiber ceramic or TPU enhancing this rigidity while at the same time offering a thermal barrier functionality. The assembly is itself surrounded on all sides by a coating which provides abrasion resistance and ease of washing, such as silicone, for example.

In the form of embodiment illustrated in FIGS. 1 to 5, two trapezoidal base panels 44a, 44b (FIGS. 1 and 5) are held by the tubular elements forming the base faces 14a, 14b; two rectangular lateral panels 46a, 46b (FIGS. 1 and 3) and a rectangular upper panel 48b are held by the four tubular elements respectively forming the lateral faces 18a, 18b and the upper face 16b. An optional rectangular fourth panel 48a (FIG. 4) may be held by the two tubular elements forming the lower face 16a; that panel 48a is referred to as the lower panel.

Whatever the design chosen for the heating enclosure 12, it is always possible to add or to not add a lower panel 48a thereto. The lower panel 48a may prove useful for protecting certain zones during repair. For example, certain joints are not very well able to withstand heat. The lower panel 48a isolates these zones from the heat contained in the heating enclosure. In that case, the lower panel 48a has an opening so that the heat can reach the zone 3 of the structure 2. The lower panel 48a may also be used to protect a painted surface in order to avoid the operator dirtying or scratching it without having to insulate it against the heat. Depending on the type of configuration, the operator chooses whether he is using a lower panel and, if he is using one, whether or not this lower panel 48a is to have an opening.

Whatever the shape of the framework, it is possible for at least one panel to offer access to the inside of the heating enclosure 12, for example, so as to allow an operator to access the inside thereof. The repair device 1 may or may not comprise one or more access doors 49.

In the embodiment illustrated in FIG. 5, it is two trapezoidal base panels 44a, 44b that perform this function. FIG. 5 shows the panels 44a, 44b, each one provided with a door 49. FIG. 6 shows the panels 44a, 44b without a door. It is also possible to have one panel provided with a door and the other not provided with the door.

The panel that offers access to the inside of the enclosure comprises a part made of a material that allows opening/closing to be achieved, for example, using a zipper fastener. This part may, for example, be made with thermoplastic polyurethane (TPU) alone.

It is also possible to provide a lock chamber 50 at one or more of the panels providing access to the inside of the enclosure. In the embodiment illustrated in FIG. 5, a lock chamber 50 is provided at the panel 44a.

In the case of very large-sized structures 2, it is possible to couple the devices 1 together to enlarge the size of the heating enclosure 12. The devices 1 may be coupled via their lateral faces or their base faces, namely the faces associated with the lower face or with the structure if there is no lower face. Either the faces of the frame 4 that are to be associated with one another are perpendicular to the lower face 16a and can therefore be superposed with one another in order to achieve coupling, or they are not perpendicular and it is necessary to resort to an additional sleeve in order to connect the faces concerned.

In the embodiment illustrated, coupling is achieved at the trapezoidal base faces 14a, 14b which are perpendicular to the lower face 16a: the base faces of the two devices 1 can be superposed on one another directly.

To attach them, the Velcro covering used for attaching the panels may be different in type from one device to another: in one of the devices the Velcro strips associated with the tubular elements are of the loop type and those associated with the panels of the hook type and in the other device, the Velcro strips associated with the tubular elements are of the hook type and those associated with the panels of the loop type. In this way, the panels that are to be coupled can be joined together directly by the Velcro strips.

When the Velcro coatings are of the same type from one device to another, it is possible to use an intermediate complementary Velcro plate. The plate comprises, on each of its two opposite faces, a Velcro strip of identical type, for example hook type, that complements the one present on the tubular elements, for example of the loop type.

No panel 8 is fitted between the two frames of the coupled devices. The heating enclosure is thus double-sized. It is possible to couple more than two devices according to the size of the zone 3 and to combine couplings via lateral faces and couplings via base faces (or other faces according to the configuration of the device).

It is also possible to design elementary modules 8' of panels 8 which are associated in order to form the desired geometry, using any known means such as those described hereinabove and, for example, by hook and loop means or by adhesive surfaces, stickers, etc. FIG. 6 depicts modules 8' of rectangular and triangular geometries, assembled to create the trapezoidally shaped base panel 44a.

The repair device comprises heating means 28 allowing the interior space inside the heating enclosure 12 to be heated and to attain the expected temperature for repairing the structure 2. According to the embodiment illustrated, the heating means take the form of a hot air generation device, for example in the form of a hot air gun 28, of which the duct 52 that expels the hot air is introduced into the opening 26 made in one of the panels for the passage of hot air into the inside of the enclosure 12. The duct 52 makes the connection between the hot air gun 28 and the heating enclosure 12. The end of the duct 52 that is introduced into the heating enclosure 12 via the opening 26 provided for that purpose may be threaded so that it can be held in position in the opening 26 by a nut screwed onto the end of the duct 52 inside the enclosure 12. The nut attaches the duct 52 to the corresponding panel and makes it possible to prevent the duct from pulling out of the enclosure. Any other means, such as a clip fastening or some other fastening, could be used.

In the form of embodiment illustrated, and as was seen earlier, the hot air gun 28 has an additional function as a pump 22. In the form of embodiment illustrated, the hot air gun 28 is in communication with the inside of the heating enclosure 12 so as to raise its temperature, and with one of the tubular elements 6 so as to inflate the tubular elements.

The inflating of the frame 4 may also be assured by a pump 22, or equivalent, independent of the hot air gun 28.

In the form of embodiment illustrated, the unit 53 that performs the heating (hot air gun 28) and inflation (pump 22) function also performs the suction function for attaching the suction cups (air pump 40). As before, these three functions could be performed independently and separately or combined in pairs in two units or in threes in a single unit 53 as in the form of embodiment illustrated.

The hot air gun 28, the pump 22 and the air pump 40 are controlled from a control center 56. The control center 56 in the form of embodiment illustrated takes the form of a carry case having all the controls, input members and display screens needed. Different and independent control centers specific to the hot air gun 28, to the pump 22 and to the air pump 40, if these constitute independent and separate devices, may also be provided.

In order to control the heating, it is necessary to know the temperature achieved inside the heating enclosure 12. The device 1 comprises temperature detection means inside the enclosure 12 and coupled to the control center 56 that controls the means of heating the enclosure 12. The detection means take the form of at least one temperature measurement sensor placed inside the heating enclosure 12 and, for example, attached by any known type of means to one or more tubular elements 6 and/or one or more panels 8. The sensor may, for example, be of the thermocouple type. At least one sensor is also placed in the zone 3 of the structure. This is because it is necessary to achieve the repair temperature in zone 3, but not absolutely essentially everywhere else in the enclosure 12. The temperature measurement sensors are connected to the control center 56 outside the heating enclosure 12 so as to transmit to the control center the temperature(s) detected.

According to one possible form of embodiment, several temperature measurement sensors are arranged at several different locations in the heating enclosure and several temperature measurement sensors are located at several points of the structure 2.

As illustrated in FIG. 1, the collection of sensors is connected to the control center 56 by wires 58 which pass through one of the panels 8. According to one possible alternative, the wires could pass underneath the panel in order to avoid the need to make orifices therein (in that case, there is no lower panel).

In the form of embodiment illustrated, the wires 58 pass through the base panel 14a. Thus, the base panel 14a allows the passage of the duct 52 of the hot air gun and of the temperature measurement sensor wires 58, and this means that the unit 53 that performs the function of hot air gun and air pump and the control center can be situated close to one another, the control center being connected to the unit 53 in order to control it, for example, in the example illustrated by a lead 60. Any other means of communication between the sensors and the unit (or the independent devices) and between the control center(s) and the unit (the independent devices) is possible, such as a wireless communication, for example.

According to the application, it is possible to elect to have available a range of devices of different sizes; the device of the most suitable size is chosen, according to the repair, in the knowledge that it can be coupled with another in order to increase the size.

The repair method comprises the following steps:

The first step is to inflate the frame 4. Specifically, the frame 4 is stored flat and deflated: thus, it takes up very little space when stored and can be handled and transported easily. The operator connects the control center 56, in this instance the carry case, to the valve or valves 20 used for inflating the frame 4. He switches on the pump 22 to inflate the frame. Inflation may be stopped by the operator using the control center 56 or automatically (through the use of sensors, such as pressure or position sensors).

Once the frame is inflated, it is positioned in such a way as to contain the zone 3 of the structure 2 inside the lower face 16a. The operator installs the suction cups 30 on the tabs 32 and, using the control center 56, switches on the air pump in order to attach the suction cups and thus hold the frame 4 in place.

The panels 8 are fixed to the frame 4.

The operator may enter the enclosure 12 via the door 49 to fix the collection of temperature sensors and connect them to the control center. He also fixes the duct 52 in the opening 26 in the panel provided for that purpose. If the device has no door 49, since the panels 8 are removable, all he needs to do is detach one panel 8 in order to gain access to the inside of the enclosure 12 to fit the sensors and the duct 52.

The operator then heats the interior space 10 inside said enclosure 12 in order to reach a determined baking temperature. The operator can, using the control center, view the temperature reached at various points in the heating enclosure 12 and communicated by the corresponding sensors, and check them in terms of value and consistency if several temperatures have been measured, adjusting the heating if necessary. This adjustment may be performed automatically. The use of several sensors makes it possible to check the uniformity of the temperature in the enclosure. It also has the function of assuring measurements in the event of one of the sensors breaking down, or of detecting a sensor failure through isolated spurious measurements.

The repair method thus offers the advantages of avoiding recourse to cumbersome means such as autoclaves or ovens and of avoiding having to dismantle and transport damaged components. The method can be performed quickly, simply, and anywhere.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for repairing an aircraft structure comprising at least one zone to be heated with a hot fluid and which comprises the following steps:
   inflating a frame fabricated from a heat resistant material to form a framework;
   attaching panels fabricated from a heat resistant material removably to the frame to form a heating enclosure;
   positioning the heating enclosure over the zone of the aircraft structure;
   using a heating device to heat an interior space of the heating enclosure and the zone with the hot fluid to an elevated temperature to achieve the repair of the zone of the aircraft structure.

2. The repair method as claimed in claim 1, and which comprises a step of holding the heating enclosure in position using suction cups connected to at least one of the frame or to the panels.

3. The repair method as claimed in claim 1, wherein the inside of the heating enclosure is heated using a hot fluid transmission system and wherein the same hot fluid transmission system is used for inflating the frame and for heating the heating enclosure.

4. The repair method as claimed in claim 3, wherein the hot fluid transmission system comprises a hot air gun, a pump and an air pump.

5. The repair method as claimed in claim 4, wherein the hot air gun, the pump and the air pump are combined in a single unit.

6. The repair method as claimed in claim 4, wherein the hot air gun, the pump and the air pump are all controlled by a control unit.

7. The repair method as claimed in claim 1, wherein temperature detection means are provided inside the heating enclosure and are connected to a heating control center outside the heating enclosure.

8. The repair method as claimed in claim 1, wherein a temperature is detected using at least one temperature measurement sensor inside the heating enclosure and in a region of the zone of the structure.

9. The method as claimed in claim 8, wherein a plurality of temperature measurement sensors are arranged at a plurality of different points inside the heating enclosure and a plurality of temperature measurement sensors are arranged at a plurality of points of the structure.

10. The repair method as claimed in claim 1, further comprising a plurality of frames, wherein the frames are coupled via at least one of their lateral face or base face in order to enlarge a size of the heating enclosure.

11. The repair method as claimed in claim 2, wherein the inside of the heating enclosure is heated using a hot fluid transmission system and wherein the same hot fluid transmission system is used for inflating the frame, for heating the heating enclosure, and for evacuating the suction cups.

12. The method according to claim 1, wherein the heat resistant material of the panels is coated with a silicone coating.

13. The method according to claim 1, wherein the heat resistant material of the panels comprises a material being resistant to temperatures of up to 250 degrees.

14. The method according to claim 1, wherein the heat resistant material of the frame comprises thermoplastic polyurethane.

15. The method according to claim 1, wherein the heat resistant material of the frame comprises a polyester fiber ceramic material.

16. The method according to claim 1, wherein the heat resistant material of the frame is coated with a silicone coating.

17. The method according to claim 1, wherein the heat resistant material of the panels comprises thermoplastic polyurethane.

18. The method according to claim 1, wherein the heat resistant material of the panels comprises a polyester fiber ceramic material.

19. A method for repairing an aircraft structure comprising at least one zone to be heated with a hot fluid and which comprises the following steps:
    inflating a frame to form a framework;
    attaching panels removably to the frame along edges of the panels, the panels having reinforcers along the edges thereof that are removably attached to the frame, to form a heating enclosure;
    positioning the heating enclosure over the zone of the aircraft structure;
    using a heating device to heat an interior space of the heating enclosure and the zone with the hot fluid to an elevated temperature to achieve the repair of the zone of the aircraft structure.

20. A method for repairing an aircraft structure comprising at least one zone to be heated with a hot fluid and which comprises the following steps:
    inflating a frame to form a framework;
    attaching panels removably to the frame to form a heating enclosure;
    attaching a lower panel to the frame, which lower panel includes an opening therein,
    positioning the heating enclosure over the zone of the aircraft structure such that the opening is positioned over the zone so as to provide a thermal communication between an interior of the enclosure and the zone;
    using a heating device to heat an interior space of the heating enclosure and the zone with the hot fluid to an elevated temperature to achieve the repair of the zone of the aircraft structure.

* * * * *